United States Patent

Hibbler et al.

Patent Number: 5,806,371
Date of Patent: Sep. 15, 1998

[54] GEAR ARRANGEMENT WITH BACKLASH ADJUSTMENT

[75] Inventors: John C. Hibbler, Lake Orion; Richard S. Silbert, Goodrich; Eric P. Jung, Orion, all of Mich.

[73] Assignee: American Axle & Manufacturing, Inc., Detroit, Mich.

[21] Appl. No.: 685,040

[22] Filed: Jul. 23, 1996

[51] Int. Cl.⁶ .................................................. F16H 55/18
[52] U.S. Cl. ........................ 74/409; 74/440; 475/230; 475/346
[58] Field of Search ............................. 475/220, 230, 475/242, 331, 346; 74/665 GB, 409, 440, 417, 424

[56] References Cited

U.S. PATENT DOCUMENTS

| | | |
|---|---|---|
| 555,295 | 2/1896 | Anderson . |
| 989,689 | 4/1911 | Berger . |
| 1,370,701 | 3/1921 | Mordano . |
| 1,946,051 | 2/1934 | Alden .................................. 475/230 X |
| 2,061,009 | 11/1936 | Rothrock . |
| 2,693,720 | 11/1954 | Wildhaber . |
| 2,791,919 | 5/1957 | Wildhaber . |
| 2,861,479 | 11/1958 | Muller . |
| 3,368,264 | 2/1968 | Wilkinson . |
| 3,715,936 | 2/1973 | Jones ....................................... 475/246 |
| 3,872,741 | 3/1975 | Berchtold et al. ...................... 475/246 |
| 4,283,963 | 8/1981 | Hickey et al. ....................... 475/246 X |
| 4,341,281 | 7/1982 | Nagy . |
| 4,407,387 | 10/1983 | Lindbert . |
| 4,584,024 | 4/1986 | Fry . |
| 4,699,235 | 10/1987 | Anderson ................................ 180/247 |
| 4,733,578 | 3/1988 | Glaze et al. ....................... 475/230 X |
| 4,821,395 | 4/1989 | Cook ..................................... 74/409 X |
| 4,821,602 | 4/1989 | Yasui et al. .............................. 475/246 |
| 4,827,786 | 5/1989 | Bailey ....................................... 74/409 |
| 4,914,800 | 4/1990 | Cook ..................................... 74/409 X |
| 4,959,043 | 9/1990 | Klotz et al. ............................. 475/230 |
| 4,969,532 | 11/1990 | Oyama et al. ........................... 180/233 |
| 5,269,731 | 12/1993 | Scudder et al. ........................ 475/230 |
| 5,293,686 | 3/1994 | Martin et al. .......................... 29/893.1 |
| 5,445,574 | 8/1995 | Sekiguchi et al. ..................... 475/346 |
| 5,480,360 | 1/1996 | Patzner et al. .......................... 475/230 |
| 5,624,345 | 4/1997 | Graft et al. ............................. 475/230 |

Primary Examiner—Charles A. Marmor
Assistant Examiner—Peter T. Kwon
Attorney, Agent, or Firm—Reising, Ethington, Learman & McCulloch

[57] ABSTRACT

An automotive differential has two annular housing parts that are screwed together and an adjustment collar that is screwed into one of the annular housing parts. A ring gear is supported by bearings in the respective housing parts for rotation on a longitudinal axis that is perpendicular to a plane through the juncture of the two annular housing parts. A pinion gear is also rotatably mounted in the annular housing part that carries the adjustment collar for rotation on an axis that is not parallel to the longitudinal axis of the ring gear. The pinion gear meshes with the ring gear. Gear backlash and bearing preload are adjusted by indexing the two housing parts with respect to each other and by positioning the adjustment collar with respect to the one housing part.

12 Claims, 1 Drawing Sheet

GEAR ARRANGEMENT WITH BACKLASH ADJUSTMENT

BACKGROUND OF THE INVENTION

This invention relates generally to gear arrangements and more particularly to gear arrangements that include backlash adjustment for meshing gears that rotate on non-parallel axes such as automotive differentials that are characterized by a ring gear and a pinion gear that drives the ring gear.

U.S. Pat. No. 5,293,686 granted to Berthold Martin et al Mar. 15, 1994 discloses a north-south automatic transaxle that includes an automotive type differential assembly that is housed in a chamber of the transaxle case. The chamber is closed by a cover member that is fastened to the transaxle case in a conventional manner by bolts as best shown in FIG. 4 of the patent. The differential assembly includes two adjusters. An inner adjuster is screwed into a threaded bore of the transaxle case and provides a seat for the outer race of a tapered roller bearing at one end of the differential case. An outer adjuster is screwed into a threaded bore of the cover member and provides a seat for the outer race of a tapered roller bearing at an opposite end of the differential case as best shown in FIG. 8 of the patent. Backlash is adjusted by rotating the two adjusters so as to move laterally in tandem and move the ring gear carried by the differential case closer to or further away from a meshing hypoid pinion gear at the end of an input shaft.

The above adjustable gear arrangement is typical of prior art arrangements in that it uses a separate adjuster associated with each bearing. The two adjusters must be attached individually to the gear housing, positioned with respect to the gear housing and then locked in an adjusted position with respect to the gear housing. Moreover, in the particular example of the patent discussed above, one of the adjusters is inside the housing in a position that is difficult to reach for adjustment.

SUMMARY OF THE INVENTION

The object of this invention is to provide an adjustable gear arrangement that is more economical and easier to adjust than known arrangements such as the prior art arrangement that is discussed above.

A feature of the adjustable gear arrangement of the invention is that the gear housing itself is used to adjust gear backlash and bearing preload.

Another feature of the adjustable gear arrangement of the invention is that the arrangement requires only one separate adjuster thereby eliminating the need for and expense of a second separate adjuster and its attachment to the housing which is required in prior art adjustable gear arrangements.

A still further feature of the adjustable gear arrangement of the invention is that the adjustment structure is readily and easily accessed from the exterior of the gear housing even if one of the bearing for the gear is not.

Yet still another feature of the adjustable gear arrangement of the invention is that several fasteners may also be eliminated along with the need for a second adjuster.

BRIEF DESCRIPTION OF THE DRAWINGS

The above and other objects, features and advantages of the invention will become more apparent from the following description taken in conjunction with the accompanying drawings wherein like references refer to like parts and wherein.

DESCRIPTION OF THE INVENTION

Figure 1:
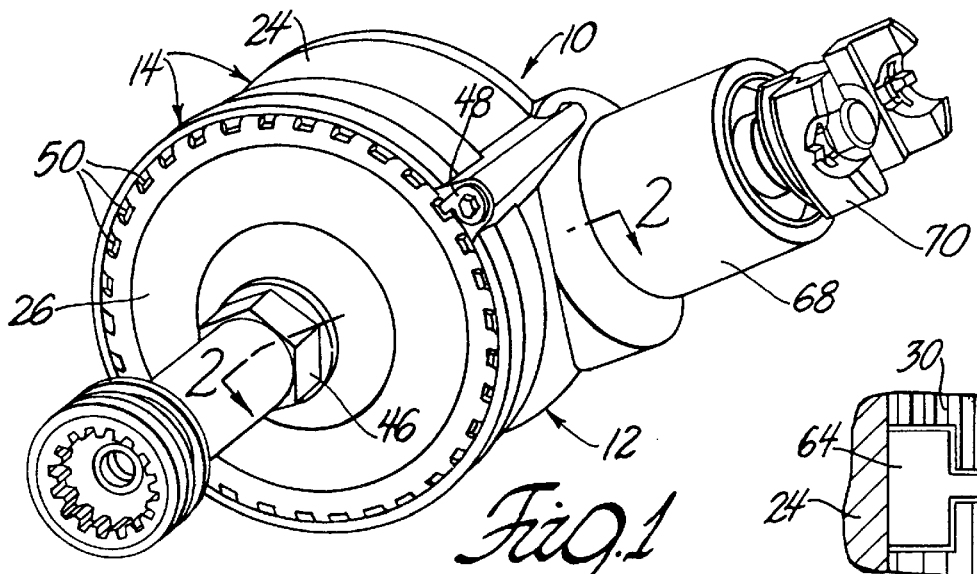
FIG. 1 is a perspective view of an automotive differential having an adjustable gear arrangement in accordance with the invention.

Referring now to the drawing, an independent front axle 10 for a four wheel drive vehicle is illustrated as an example of a suitable application of the invention. The operation of such an axle is well known from U.S. Pat. No. 4,341,281 granted to Lazlo Nagy Jul. 27, 1982; U.S. Pat. No. 4,407,387 granted to Brook Lindbert Oct. 3, 1983 and U.S. Pat. No. 4,699,235 granted to James L. Anderson Oct. 13, 1987. However, it should be understood that the invention is not limited to use in such an axle. Axle 10 includes an automotive differential indicated generally at 12. The automotive differential 12 has a carrier or housing 14 for several gears that receive engine power via an input shaft 16 and transfer the engine power to the two front drive wheels of the vehicle via two output shafts 18 and 20. The housing 14 has two annular housing parts 24 and 26 that are adjustably secured together in a clam shell arrangement such as that shown in the Anderson patent cited above. In the clam shell arrangement each annular part carries a bearing that support a ring gear 27 for rotation on a longitudinal axis L that is substantially perpendicular to an imaginary plane P through the juncture of the two annular housing parts 24 and 26 and that coincides with the longitudinal axis of the output shafts 18 and 20.

Annular housing part 24 is bell-shaped and has a stepped bore at the small diameter end that comprises an inner cylindrical bearing seat 28, an intermediate, internally threaded portion 30 of larger diameter, and an outer cylindrical seal seat 32 of still larger diameter. The large diameter end of annular housing part 24 has a stepped opening comprising an inner internally threaded portion 34 and an outer cylindrical seal surface 36 of larger diameter.

Annular part 26 is generally T-shaped and has an end wall 40 that fits into the large diameter end of the bell-shaped part 24. The periphery of the end wall 40 has an annular groove that carries a conventional elastomeric O-ring seal 42 that engages the seal surface 36 to seal the joint between the two parts. The end wall 40 has an annular skirt 44 that is externally threaded and engages the internally threaded portion 34 to screw the two annular housing parts 24 and 26 together. This secures the two annular parts to each other while allowing a fine adjustment of the longitudinal position of the two parts relative to each other. The use of screw threads also eliminates the need for several bolts and nuts or threaded holes which characterize the two part housings of the prior art.

Annular housing part 26 includes a hexagonal shaped portion 46 that is engageable by a conventional open ended wrench to facilitate the fine adjustment of the housing parts 24 and 26 with respect to each other. An adjusted position of the housing parts 24 and 26 is maintained by a lock piece 48 that is bolted to the housing part 24 and engages one of a circumferential series of grooves 50 in an exterior portion of the end wall 40 as best shown in FIG. 1.

Figure 2:
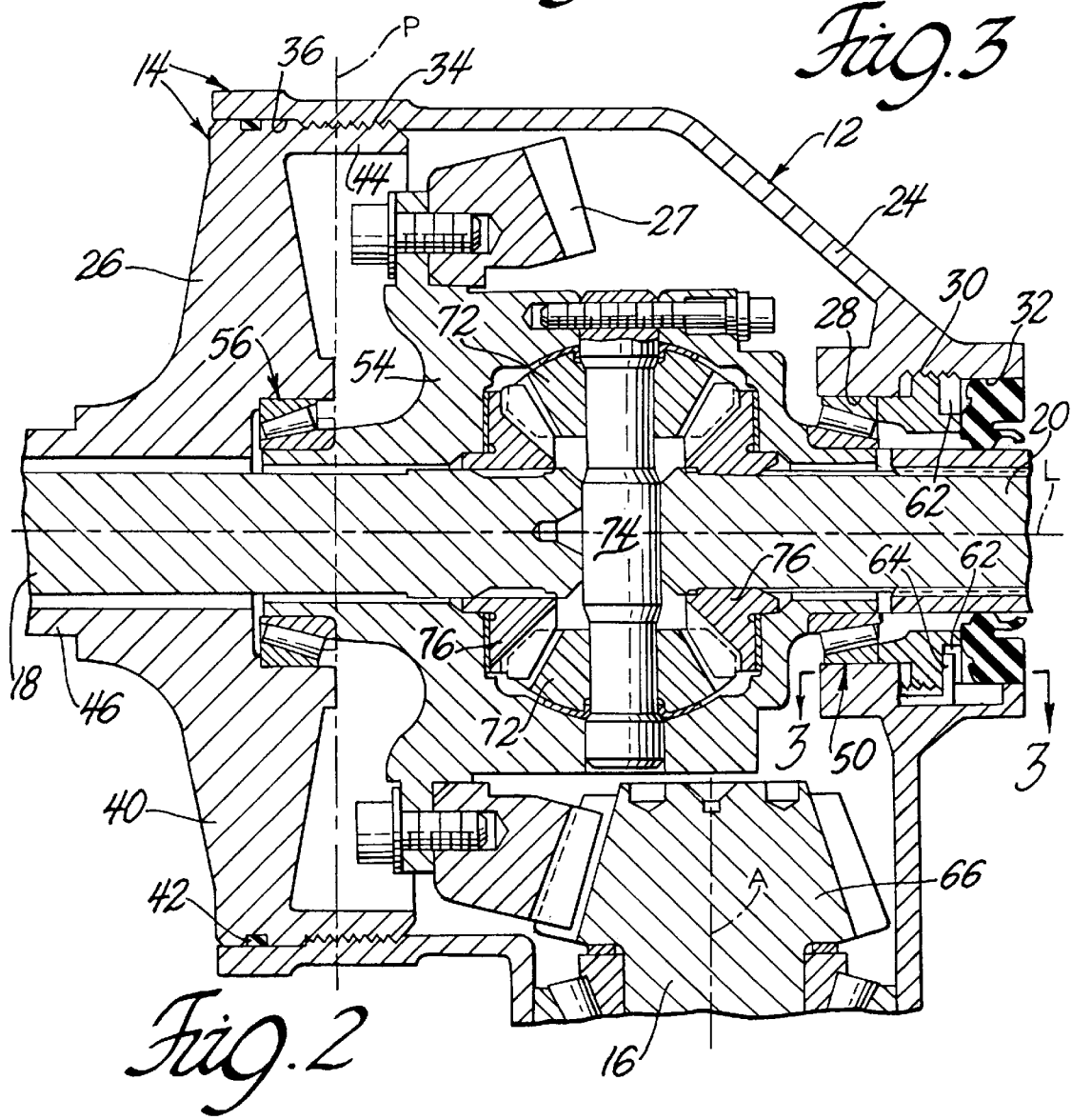
FIG. 2 is a section taken substantially along the line 2—2 of FIG. 1 looking in the direction of the arrows.

A drive member in the form of a differential case 54 is mounted in the gear housing 22 for rotation about longitudinal axis L by axially spaced bearings 56 and 58. Bearing 56 is a conventional ball or roller bearing having a thrust capacity in at least one direction, i.e., toward the left as shown in FIG. 2. Bearing 56 is illustrated as a tapered roller bearing that has an outer race or cup mounted in a bore of end wall 40 against a thrust shoulder and an inner race or cone mounted on an end of the differential case 54 against a thrust shoulder. Bearing 56 thus supports one end of the differential case 54 for rotation about longitudinal axis L while fixing the differential case 54 with respect to the housing part 26 in the axial direction.

Bearing 58 is also shown as a tapered roller bearing having a thrust capacity in one direction, i.e., toward the right as shown in FIG. 2. Bearing 58 has an outer race or cup mounted in the bore 28 at the small diameter end of the bell-shaped housing part 24 and an inner race or cone mounted on an opposite end of the differential case 54 against a thrust shoulder. Bearing 58 thus supports the opposite end of the differential case 54 for rotation about longitudinal axis L. However the axial position of the opposite end of the differential case 54 with respect to the housing part 24 is not fixed. The axial position is adjusted by means of an adjustment collar 60 that has an externally threaded portion that screws into the intermediate internally threaded portion 30 of the housing part 24 and engage the outer race of the bearing 58. Thus the axial position of the bearing 58 with respect to the housing part 24 housing is subject to a fine adjustment by turning the adjustment collar 60.

Figure 3:
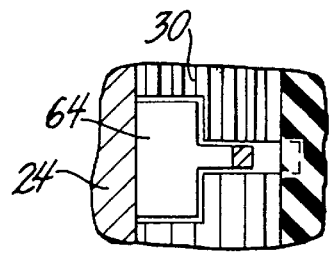
FIG. 3 is a section taken substantially along the line 3—3 of FIG. 2 looking in the direction of the arrows.

The adjustment collar 60 has a circumferentially spaced series of notches 62 in an outer face that are readily accessible from the exterior of the housing via the bore at the small diameter end of the housing part 24. These notches provide a convenient structure for adjusting collar 60. An adjusted position of the adjustment collar 60 is maintained in any suitable manner. For example, a T-shaped lock tab 64 may be loaded into a T-shaped slot cut into the threaded portion 30 and seal seat 32 of the housing part 2 before the adjustment collar is assembled to the housing part 24. The stem of the lock tab 64 is then bent up into engagement with one of the notches 62 in the periphery of the adjustment collar 60 after the desired adjustment is achieved as best shown in FIGS. 2 and 3.

Ring gear 27 is attached to differential case 54 by bolts or other suitable fasteners and engages a pinion gear 66 at the inboard end of the input shaft or second drive member 16. The second drive member 16 is mounted in a boss 68 of housing part 24 for rotation about an axis A that is not parallel to the longitudinal axis L of the first drive member or differential case 54 as best shown in FIG. 2. Axes A and L do not intersect as shown in FIG. 1 so that pinion gear 66 is a hypoid gear.

The second drive member or input shaft 16 is mounted by two spaced roller bearings, one of which is partially shown, in a conventional arrangement that allows rotation of the input shaft 16 about the axis A but fixes the input shaft 16 with respect to the housing boss 68 in the direction of the axis A.

The differential 12 typically includes an external yoke 70 as shown in FIG. 1 for attaching the drive member 16 to an internal combustion engine and transmission by means of a propeller shaft (not shown). The differential 12 is typically but not necessarily a bevel gear differential that carries four gears in an orthogonal arrangement inside the differential case 54. The differential gears include two diametrically opposed pinion gears 72 that are rotatably mounted on the case by a cross pin 74 and two side gears 76 that are journalled in the opposite ends of the case. Each side gear 76 meshes with the two pinion gears 72 and is connected to the end of an output shaft 18 or 20 for driving one of a pair of wheels that are coupled by the differential 12 to drive the vehicle in a well known manner.

The backlash between the hypoid pinion gear 66 and the ring gear 27 (as well as the preload of the bearings 56 and 58) is adjusted by making two fine adjustments to position the ring gear 27 in a precise location along the longitudinal axis L with respect to the pinion gear 66. One adjustment is the relative position of the two housing parts 24 and 26 with respect to each other in the longitudinal direction of axis L which is achieved by screwing housing part 26 into or out of housing part 24. The second adjustment is the relative position of the ring gear 27 and differential case or drive member 54 with respect to the housing part 24 which is achieved by screwing the adjustment collar 60 into or out of the housing part 24. These two adjustments provide a significant range of fine adjustment of the ring gear 27 with respect to the pinion gear 66 so that the backlash between the pinion gear 66 and the ring gear 27 can be fine tuned to provide the desired conjugate tooth action between the two gears. Thus the problems associated with too much backlash or too little backlash can be practically eliminated or at least reduced substantially. The two adjustments also adjust the preload of the bearings 56 and 58 to a desired value.

It should be noted that only one separate adjustment collar is required and that the two adjustments are easily accessed from the exterior of the gear housing even though the bearing 56 is not accessible due to the presence of the stem portion 78 of the housing part 26.

Adjustment typically occurs in the following manner. The differential case assembly comprising case 54 and gears 27, 72 and 76 is inserted into housing part 24 with the adjuster 60 in its outermost position. The housing part 26 with the bearing 56 pressed in is then assembled to the housing part 24. The housing part 26 and the adjustment collar 30 are then both screwed into the housing part 24 to achieve zero backlash and a slight bearing preload. The housing part 26 and the adjustment collar 30 are then moved in tandem with respect to the housing part 24 to achieve the desired backlash. Once the desired backlash is achieved both the housing part 26 and the adjustment collar 30 may be screwed into the housing part 26 equal amounts to achieve a desired bearing preload.

While the invention has been illustrated in connection with an independent front axle 10 having a particular automotive type differential, the invention is applicable to any gear arrangement that includes two meshing gears that rotate about non-parallel axes particularly nonparallel axes that do not intersect.

In other words, the invention has been described in an illustrative manner, and it is to be understood that the terminology which has been used is intended to be in the nature of words of description rather than of limitation.

Obviously, many modifications and variations of the present invention in light of the above teachings may be made. It is, therefore, to be understood that, within the scope of the appended claims, the invention may be practiced otherwise than as specifically described.

The embodiments of the invention in which an exclusive property or privilege is claimed are defined as follows:

1. A gear arrangement having a gear housing, a first drive member having a ring gear mounted in the gear housing for rotation about a first axis, and a second drive member having a pinion gear meshing with the ring gear and mounted in the gear housing for rotation about a second axis that is not parallel to the first axis, characterized in that:

the gear housing has a first part and a second part that are secured together adjustably, the first part has a first bearing that supports the ring gear for rotation about the first axis and that is seated on a fixed bearing seat of the first part to fix the ring gear in the axial direction with respect to the first part, the second part has a second bearing that supports the ring gear for rotation about the first axis and an adjustment collar that adjusts the axial position of the second bearing with respect to the second part, and the second drive member having the pinion gear is mounted on the second part for rotation in the gear housing whereby backlash in the meshing engagement of the pinion gear and the ring gear is adjusted by positioning the first and second parts with respect to each other and the adjustment collar with respect to the second part.

2. The gear arrangement as defined in claim 1 wherein the adjustment collar and the second part are secured together by threaded portions and adjusted by screwing one into the other.

3. The gear arrangement as defined in claim 1 wherein the first and second bearings have a thrust capacity in at least one direction.

4. The gear arrangement as defined in claim 1 wherein the first drive member is a case for a bevel gear differential and the pinion gear is a hypoid gear.

5. A gear arrangement having a gear housing, a first drive member having a ring gear mounted in the gear housing for rotation about a first axis, and a second drive member having a pinion gear meshing with the ring gear and mounted in the gear housing for rotation about a second axis that is not parallel to the first axis, characterized in that:

the gear housing has a first part and a second part that are secured together adjustably, the first part has a first bearing that supports the ring gear for rotation about the first axis and that fixes the ring gear in the axial direction with respect to the first part, the second part has a second bearing that supports the ring gear for rotation about the first axis and an adjustment collar that adjusts the axial position of the second bearing with respect to the second part, the second drive member having the pinion gear is mounted on the second part for rotation in the gear housing whereby backlash in the meshing engagement of the pinion gear and the ring gear is adjusted by positioning the first and second parts with respect to each other and the adjustment collar with respect to the second part; and the first part and the second part being secured together by threaded portions and adjusted by screwing one part into the other.

6. The gear arrangement as defined in claim 5 wherein the adjustment collar and the second part are secured together by threaded portions and adjusted by screwing one into the other.

7. A gear arrangement having a gear housing, a first drive member having a ring gear mounted in the gear housing for rotation about a first axis, and a second drive member having a pinion gear meshing with the ring gear and mounted in the gear housing for rotation about a second axis that is not parallel to the first axis, characterized in that:

the gear housing has a first part and a second part that are secured together adjustably, the first part has a first bearing that supports the ring gear for rotation about the first axis and that fixes the ring gear in the axial direction with respect to the first part, the second part has a second bearing that supports the ring gear for rotation about the first axis and an adjustment collar that adjusts the axial position of the second bearing with respect to the second part, the second drive member having the pinion gear is mounted on the second part for rotation in the gear housing whereby backlash in the meshing engagement of the pinion gear and the ring gear is adjusted by positioning the first and second parts with respect to each other and the adjustment collar with respect to the second part; and the gear housing having an external structure for maintaining an adjusted position of the first part with respect to the second part.

8. The gear arrangement as defined in claim 7 wherein the external structure comprises a series of notches in an exterior portion of one housing part and lock piece carried by an exterior portion of the other housing part.

9. A gear arrangement having a gear housing, a first drive member having a ring gear mounted in the gear housing for rotation about a first axis, and a second drive member having a pinion gear meshing with the ring gear and mounted in the gear housing for rotation about a second axis that is not parallel to the first axis, characterized in that:

the gear housing has a first part and a second part that are secured together adjustably, the first part has a first bearing that supports the ring gear for rotation about the first axis and that fixes the ring gear in the axial direction with respect to the first part, the second part has a second bearing that supports the ring gear for rotation about the first axis and an adjustment collar that adjusts the axial position of the second bearing with respect to the second part, the second drive member having the pinion gear is mounted on the second part for rotation in the gear housing whereby backlash in the meshing engagement of the pinion gear and the ring gear is adjusted by positioning the first and second parts with respect to each other and the adjustment collar with respect to the second part; and the second part being bell shaped and the first part having an externally threaded annular portion that engages an internally annular threaded portion at a larger diameter end of the first part to secure the parts together adjustably.

10. The gear arrangement as defined in claim 9 wherein the threaded portions of the first and the second parts are concentric with the first axis.

11. The gear arrangement as defined in claim 10 wherein the first part is T-shaped and has a stem that spaces the first bearing inwardly of an open end of the stem so that the first bearing is not readily accessible from the exterior of the gear housing.

12. A gear arrangement having a gear housing, a first drive member having a ring gear mounted in the gear housing for rotation about a first axis, and a second drive member having a pinion gear meshing with the ring gear and mounted in the gear housing for rotation about a second axis that is not parallel to the first axis, characterized in that:

the gear housing has a first part and a second part that are secured together adjustably, the first part has a first bearing that supports the ring gear for rotation about the first axis and that fixes the ring gear in the axial direction with respect to the first part, the second part has a second bearing that supports the ring gear for rotation about the first axis and an adjustment collar that adjusts the axial position of the second bearing with respect to the second part, the second drive member having the pinion gear is mounted on the second part for rotation in the gear housing whereby backlash in the meshing engagement of the pinion gear and the ring gear is adjusted by positioning the first and second parts with respect to each other and the adjustment collar with respect to the second part; and the first part being T-shaped and having a stem that spaces the first bearing inwardly of an open end of the stem so that the first bearing is not readily accessible from the exterior of the gear housing.

* * * * *